Patented Dec. 4, 1923.

1,476,233

UNITED STATES PATENT OFFICE.

CARL A. ZELL AND WALTER F. STRAUB, OF CHICAGO, ILLINOIS, ASSIGNORS TO ZELL-STRAUB LABORATORIES, INCORPORATED, A CORPORATION OF ILLINOIS.

BIOLOGICAL PRODUCT.

No Drawing.     Application filed August 23, 1920.    Serial No. 405,412.

*To all whom it may concern:*

Be it known that we, CARL A. ZELL, formerly a subject of the Emperor of Germany, having declared my intention of becoming a citizen of the United States of America, and WALTER F. STRAUB, a citizen of the United States, both residing at Chicago, in the county of Cook and State of Illinois, have invented certain new and useful Improvements in Biological Products, of which the following is a full, clear, concise, and exact description.

Our invention relates to improved human and veterinary biological products and to a new process for manufacturing the same.

More particularly our invention refers to bioloical products in which biologics such as vaccines, bacterins, serums (antitoxins), cultural filtrates (toxins), etc., of human and animal origin (veterinary) may be incorporated in preservatives that are non-toxic, non-irritating, bactericidal and miscible and that do not tend to lower the initial potency of the associated biologics. By the term biologics we refer and intend vaccines, bacterins, serums, antitoxins, cultural filtrates, virus, bacterial extracts and similar products.

A bactericidal dye may be defined as being a chemical which has the property of inhibiting the propagation and, when in proper concentration, killing bacterial organisms and certain viruses and which also has the property of imparting color to a biological product and which assists in maintaining the antigenic value or therapeutic potency of the product.

For a better understanding of the nature and scope of our invention reference may be had to the following description and to the appended claims wherein our invention is defined with particularity.

Heretofore, in biological products, such as have been utilized in the prevention and treatment of diseases in both humans and animals, biologics have been incorporated or preserved either with phenol, cresol or tri-cresol products. Biological products of this character are more toxic and irritating when introduced into an animal body than is desirable. Again, preservatives such as phenol, cresol or tri-cresol products for biologics, are not miscible is all proportions to as satisfactory a degree as is desired to secure optimum results. Furthermore, such preservatives as have heretofore been used and such as are mentioned above are not thoroughly compatible with protein matter which is comprised in all biologics as well as in the tissues of humans and animals. What is more important, phenols and cresols are not capable of being incorporated in biological products in a sufficiently high concentration to be true preservatives of the associated biologics because the proper concentration of phenols and cresols to establish true preservative conditions would make the resulting biological product too toxic and too irritating to produce effective results. By means of our present invention, the preservatives in our biological products may be used to a sufficiently high concentration that they constitute true preservatives without producing any toxic or irritating effects.

By our present invention we procure both a sterile and a strongly bactericidal biological product which substantially retains its initial potency and does not possess undesirable features such as toxicity irritancy and low bactericidal effects. At the same time, we provide an economical product thereby rendering biological products made in accordance with our present invention suitable for extensive and varied uses.

The preservatives which we employ in our present biological products comprise bactericidal dyes and, in some instances preferably those of the acridine series. The dyes of this series which we have found suitable are acriflavine and proflavine. It is to be understood, however, that we do not intend to be limited to these two specific dyes of this series inasmuch as we may use any of the derivatives of the dyes of the acridine series, such as the halogen and metallic derivatives, and any other non-toxic bactericidal dyes.

Another bactericidal dye which we have found suitable as a preservative for biological products is brilliant green. It is to be understood, however, while we prefer proflavine and acriflavine bactericidal dyes and the halogen and metallic derivatives thereof, we have discovered that bactericidal dyes, as preservatives in biological products produce new results.

The process that we employ in manufacturing biological products in accordance with our invention is as follows:

Bactericidal dyes are most readily procured in the form of crystals that are soluble in water. A solution of crystals of a bactericidal dye may be formed and the specific or desired biologic may be introduced therein. The solution of the bactericidal dye serves as a preservative for the associated biologic. Again, a solution incorporating the biologic may first be formed and then a selected bactericidal dye in the form of crystals may be introduced into this solution. The results of both processes is that the selected biologic is incorporated in a preservative comprising a bactericidal dye to produce a highly satisfactory biological product.

While we have described in detail a new class of preservatives for biologics which results in the production of improved biological products, and since we have explained a process by which our biological products may be procured, we desire that only such limitations be imposed upon our invention as are required by the prior art and specified in the appended claims.

Having thus described our invention, what we claim as new and desire to secure by Letters Patent is:

1. A biological product comprising a biologic and a preservative therefor comprising a bactericidal dye of the acridine series.

2. A biological product comprising a biologic and a preservative therefor comprising a derivative of a bactericidal dye of the acridine series.

3. A biological product comprising a biologic and a preservative therefor comprising a halogen derivative of a bactericidal dye of the acridine series.

4. A biological product comprising a biologic and a preservative therefor comprising the dye proflavine.

5. A biological product comprising a biologic and a preservative therefor comprising a derivative of a proflavine dye.

6. A biological product comprising a biologic and a preservative therefor comprising a halogen derivative of a proflavine dye.

7. The process of preserving biologics in a nontoxic and antiseptic preservative so as to substantially retain their initial potency which consists in incorporating with the biologics a bactericidal dye of the acridine series.

8. The process of preserving biologics in a nontoxic and antiseptic preservative so as to substantially retain their initial potency which consists in incorporating with the biologics a halogen derivative of a bactericidal dye of the acridine series.

9. The process of preserving biologics in a nontoxic and antiseptic preservative so as to substantially retain their initial potency which consists in incorporating with the biologics the bactericidal dye proflavine.

10. An antigenic biological product comprising a non-toxic, non-irritating, water soluble, substantially non-protein coagulable, bactericidal dye substance of a character acting as a preservative in assisting in maintaining the antigenic value and fortifying the potency of the product.

In witness whereof, we have hereunto subscribed our names.

CARL A. ZELL,
WALTER F. STRAUB.